United States Patent Office.

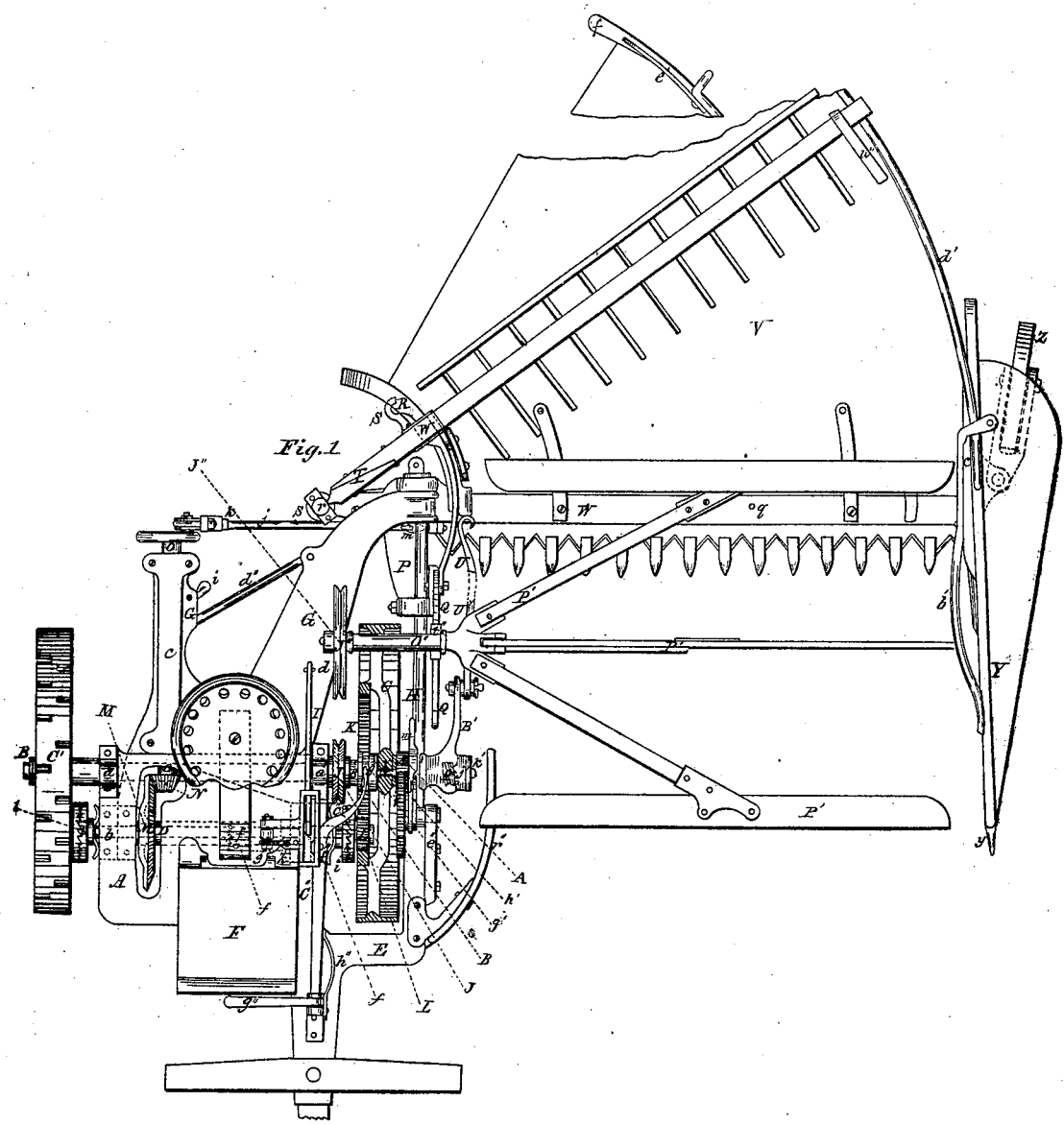

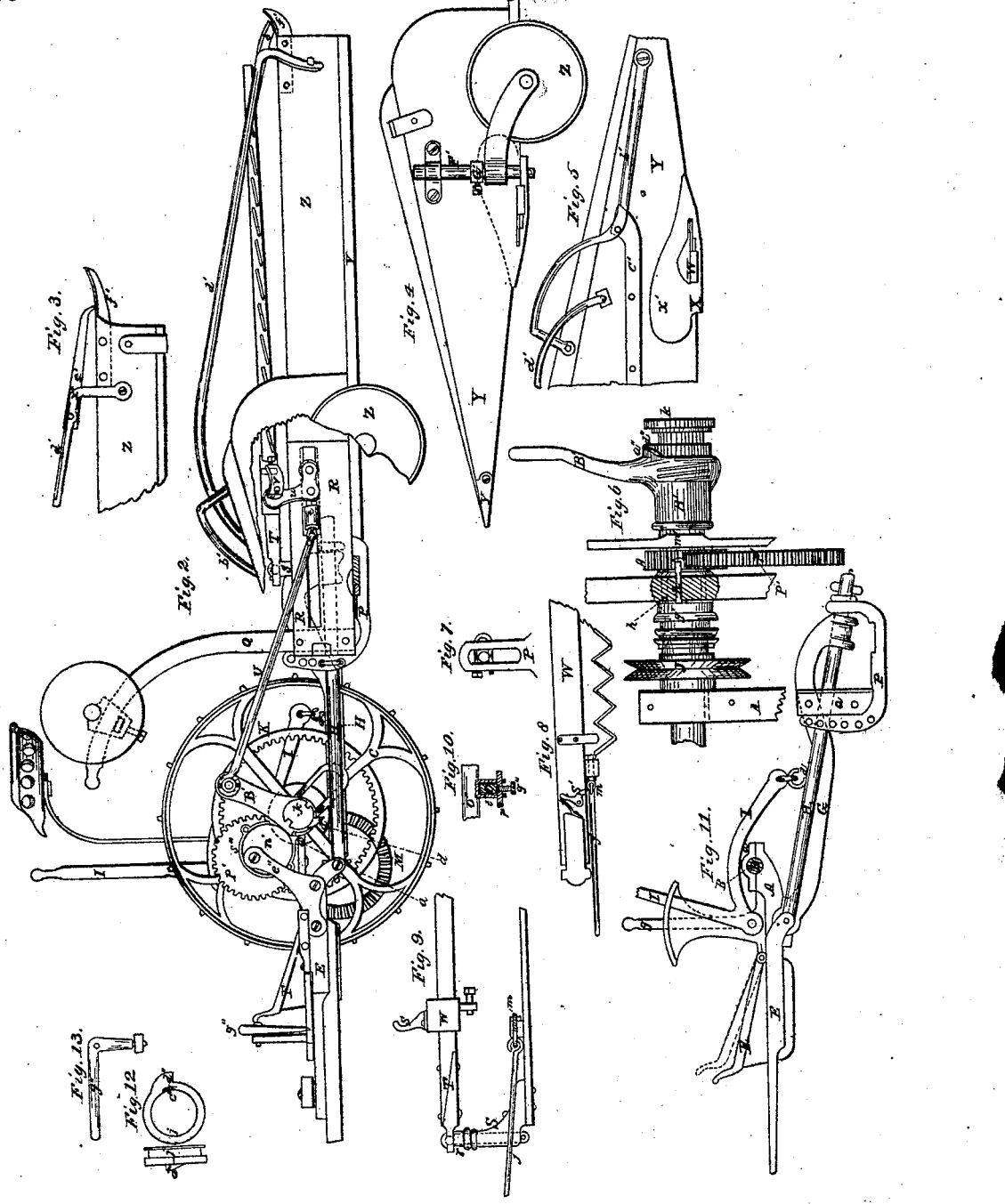

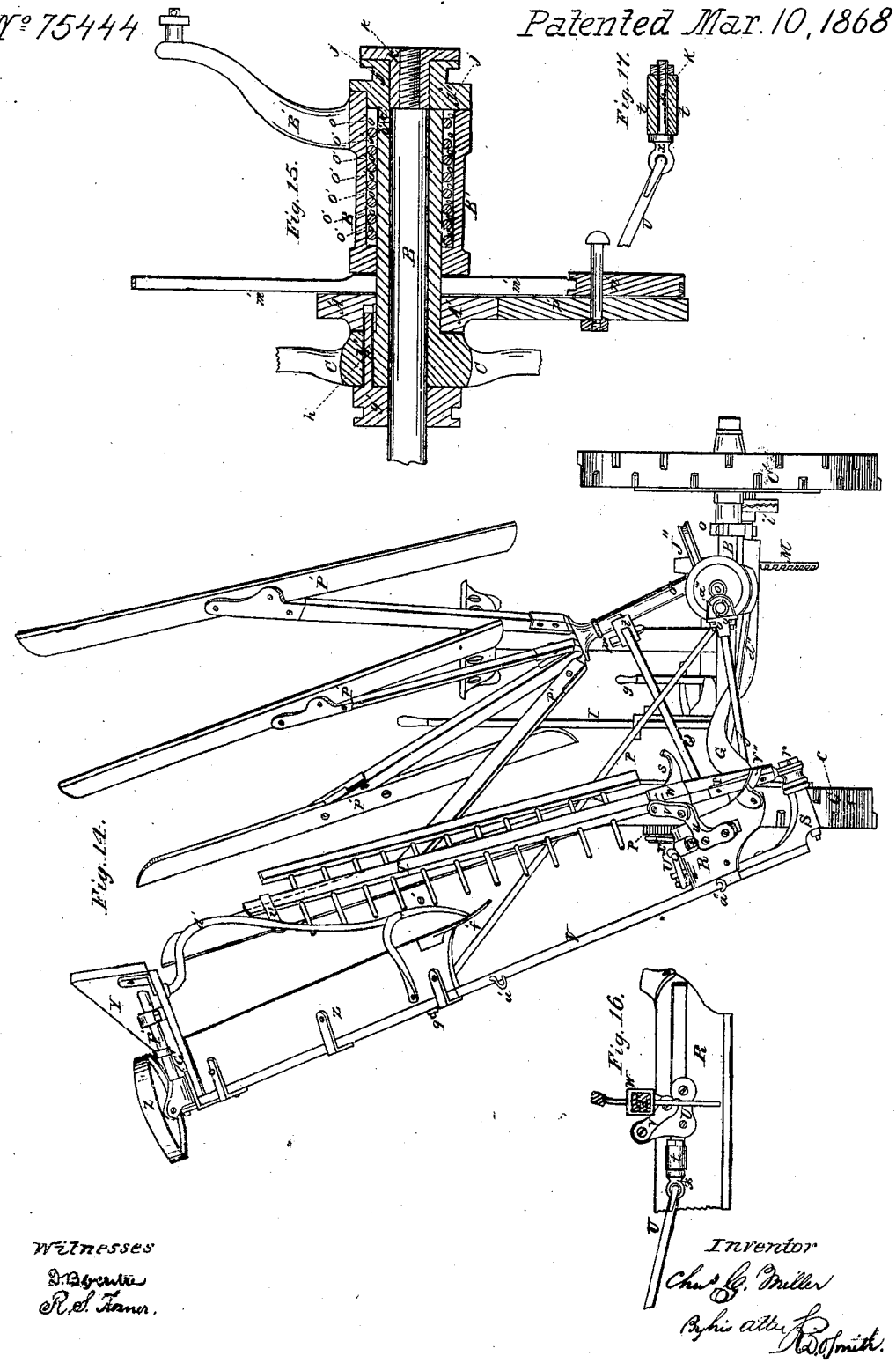

CHARLES G. MILLER, OF SPRINGFIELD, OHIO.

*Letters Patent No. 75,444, dated March 10, 1868.*

---

IMPROVEMENT IN HARVESTERS.

---

*The Schedule referred to in these Letters Patent and making part of the same.*

---

TO ALL WHOM IT MAY CONCERN:

Be it known that I, CHARLES G. MILLER, of Springfield, in the county of Clark, and State of Ohio, have invented a new and useful Improvement in Harvesters; and I do hereby declare the following to be a full, clear, and exact description of the same, reference being had to the accompanying drawings, in which—

Figure 1 is a plan view of my machine.

Figure 2 is a side elevation of the same.

Figure 3 is a view of the rear end of the rake-guide and latch.

Figure 4 is a side elevation of the divider and grain-wheel.

Figure 5 is an inside elevation of the divider, showing the forward end of the rake-guide.

Figure 6 is a view of the mechanism by which the rake is driven, and its movements regulated.

Figure 7 is a front view of the forward end of the shoe.

Figure 8 shows the latch for preventing the cutter-bar from falling when the platform is raised.

Figure 9 shows the manner of attaching the rake-head to the post around which it turns.

Figure 10 shows the manner of securing the reel to its standard.

Figure 11 is a side elevation of the main frame, dragging-frame, lever, shoe, &c.

Figure 12 is a section of the collar on the nut at the end of main axle.

Figure 13 is a view of the bent lever, by which the driving-mechanism of the rake is connected with the main driving-wheel.

Figure 14 is a rear view of my machine, showing the platform, and all connected therewith, raised to nearly a vertical position for transportation.

Figure 15 is a sectional view of the raking-mechanism.

Figure 16 shows the guide-frame of the rake, and manner of connecting the rake with the pitman; and Figure 17 shows the swivel-joint of the pitman, with the traveller, and thereby with the rake.

In describing my machine, we will call the part or parts nearest the standing grain or grass the left, and those on the opposite side the right.

The main frame A is made of cast iron, in one piece, and of the form shown in fig. 1. On the upper surface, near the rear end of the main frame, are attached the boxes $a\ a'$, in which the axle B of the main driving-wheels C C' rests, and by which the frame A with all upon it is supported. On the lower surface of the main frame, and at a proper distance forward from the rear end, are secured the boxes $b\ b$, in which the pinion-shaft D revolves. A box, F, for carrying necessary tools, is cast in the forward part of the main frame, and beyond this box is a narrow projection from the left-hand part of the frame, to which the tongue is secured. Near the same point of the main frame is a part, E, projecting towards the left, just forward and beyond the driving-wheel C, which turns backward to form a support to the mechanism which in part governs the motion of the rake. The driver's seat is secured to the upper surface of the main frame, just to the rear of the tool-box, in the usual manner. On the pinion-shaft D, at points inside and next to the boxes $b\ b$, is hung the dragging-frame G, which is of the form shown in fig. 1, the rear portion being divided in two parts, one of which, projecting backwards at right angles to the axle B, has upon its upper surface the box $c$, in which the crank-shaft rests, and the other extends further back, and, turning to the left, supports the inner shoe of the cutting and raking-apparatus and reel, by means of the drag-bar H, which extends from the part E of the main frame, where it is hinged, backward through the lugs of the shoe and the end of the dragging-frame. This dragging-frame G is capable of being raised from the ground by means of the bent lever I attached to the hook $d$ in the frame, and which is pivoted to the lower part of a T-headed standard, rising from the main frame at the right of the box $a'$, and forward of the axle B. The head of this standard is curved, having the fulcrum of the lever I for a centre, and is slotted to admit the lever, which has upon its right side a pin, to catch in any one of a series of holes on the right-hand side of the standard-head, and on the left side a spring, pressing against the left side of the head to retain it in any desired position. The two rear portions of the dragging-frame are connected and strengthened by a brace-bar, $d^2$, firmly secured to each part.

The axle B projects beyond the sides of the main frame, on the right to receive the driving-wheel C', and on the left the pulley J, which drives the reel, the collar $g'$, the driving-wheel C, and, beyond this last, the mechanism for driving the rake. The driving-wheels C C' have on the inside of each a gear-wheel, K K', which give motion to the pinions L L' on the shaft D, by which motion is communicated to the cutters through the bevel-gear wheels M and N. The bevel-wheel M is connected with the driving-wheels by the ratchet-collar $f$ surrounding the shaft D at the left of the wheel M, and operated by a lever, $g$, which passes through an opening in the main frame, and is pivoted to a projecting arm of the standard, which supports the lever I, and kept in place by the hook $h$. At each end of the pinion-shaft D, but inside the pinion-wheels L L', are the ratchet-clutches $i\ i$, which permit the driving-wheels to be turned backward in backing the machine, or a single one to be reversed while the other is going forward when the machine is turned around. The crank-shaft O rests in the box $e$ on the upper surface of the dragging-frame, and is connected with the cutter-bar by the pitman $j$. The pitman-head is in part composed of a T-shaped piece of metal, into the lower end of which is a hole to receive the pitman $j$, which screws into it, and is retained firmly by the jam-nut $k$. The upper part of this T-head is grooved, and has at each end two holes to receive the ends of the U-shaped rod, which secures the wooden box $a''$, in which the wrist-pin turns, where they are secured by nuts $o\ o$. The pitman-rod is attached to the cutter-bar by the hook at its lower end, and the swivel eye-bolt $m$.

The shoe P, shown in figs. 2 and 11, is supported by the drag-bar H, which is hinged at the rear end of the part E of the main frame outside the driving-wheel C, and passes through the end of the dragging-frame G. The forward end of the shoe P is turned up at right angles, and has a vertical slot in it to receive the bolt or drag-bar H, of such length as to permit the forward end of the shoe to be raised or lowered when it is necessary to elevate or depress the points of the cutters. On each side of this slot are holes to receive a pin or pins, which, passing through, serve to retain the shoe in any desired position. To the rear of the forward portion of the shoe, and at the left-hand side of the slot, is secured the standard Q, for the support of the reel and the guide-frame R of the rake. This standard Q is securely fastened to the shoe, and from its point of support projects upward and forward in a curve, whose centre is the centre of the axle B, so that, at whatever height the reel may be placed, the pulley-cord will always be of the same tension. This standard Q also serves as a lever, by means of which the shoe, platform, rake, and reel may be turned upon the drag-bar H as a centre, and the outer portion elevated from the ground when it is desired to transport the whole from one field to another, and the shoe, with all connected with it, may be held in a nearly vertical position by means of the rod $p$, which extends from the guard-finger bar $q$ to the hook on the dragging-frame at $q'$, fig. 1. On the top of the guard-finger bar is a latch, $s'$, to prevent the cutter-bar from falling out of its place when the platform is elevated in this vertical position.

The guard-finger bar is attached firmly to the upper surface of the shoe, and projects beyond it to the right, so as to receive the post or standard S, which is the centre about which the rake turns. Upon this standard is a head, $r$, (see fig. 9,) to the lower part of which a bolt is secured, which passes downward through a vertical hole in the standard S, and is secured by a nut at its end. On the upper surface of this head $r$ is a hemispherical depression to receive the ball on the end of the rake-head T. This is covered by a cap having a similar depression, and the two parts are held together by screws, the whole forming a ball-and-socket joint.

The rake T is made as represented in figs. 1, 2, and 9, and has upon the part passing over the guide-frame R a sleeve, $w$, of metal, to prevent wear, and to the top of this sleeve is secured the hook $s$, which holds the rake in a horizontal position during a part of its revolution. The guide-frame R, fig. 2, is secured by its forward end to the left-hand side of the forward part of the shoe, and extends backward in a curve, of which the standard S is the centre, beyond the platform far enough to allow the rake to deposit the cut grain clear of the platform. This frame R has a slot extending its whole length, and between the edges of which the traveller $t$ is confined, so that it is free to move backward and forward. To the inner or left hand of this traveller is attached the upright arm $u$, which is connected with the rake by the link $v$ at the lower side of the sleeve $w$. The top edge of the guide-frame R is horizontal for about two-thirds of its length from the forward end, where a flange, $v''$, projects to the right, to the rear end of the frame, curving upward, under the outer or right-hand edge of which the hook $s$ catches when it has, from the motion of the rake, passed beyond it, and turns the rake in a horizontal position, and retains it so until, in its forward movement, the hook $s$ has passed the forward point of said flange.

The forward end of the traveller $t$ is connected with the driving-mechanism of the rake by the pitman U, one end of which is hooked into the swivel eye-bolt $x$, passing through the traveller, and secured there by a nut.

The platform V is a sector of about one-sixth of a circle, whose centre is the standard S, and is made of thin boards, and attached to the lower edge of the guide-frame R, by its inner end, and the forward edge to the guard-finger bar W. The outer end of this guard-finger bar W is attached to the shoe X, which supports the divider Y and the upright post of the grain or caster-wheel Z. This shoe X has rising from its inner upper surface a part, $x'$, to which the divider is secured, thereby strengthening and supporting it. The forward end of the divider terminates in a cast point, $y$, which encloses it. To the upper surface of the platform, and at its outer edge, is secured the curved guide $z$, which prevents the cut grain from sliding off the platform to the left, where it would be in the way in making the next round, and on whose upper edge the end of the rake is carried as it moves backwards. At the rear end of the platform are the hooks $a''\ a''$, to receive and retain the rod $p$, when not in use to support the platform in a vertical position. Near the forward end, and on the inside of the divider Y, is the end of the bent rod $b'$, secured, which serves to throw the grain away from the divider. This rod passes backward to the forward end of the guide $z$ of the rake, where it is secured, and the end turns upward and backward, so as to keep the rake from going beyond or forward of the cutters. Near the top of the divider, and at a proper point, is secured one end of the arched guide-rod $d'$, which extends backward to the rear of the platform, where it is bent outwards and downwards, and the end secured near the end of the curved guide $z$, (see figs. 1, 2, 3, and 5.) On the inner side of this guide-rod, and at or near the angle $x''$ is fastened the latch $e'$, which is free to move, so that the rake in its backward progress may pass under it when it falls on the plate $f'$ at the end of the guide $z$. As the rake passes forward it is prevented from going back on the guide $z$ by this latch, but carried up and over the arched rod $d'$ to the forward end, when it falls upon the guide-way $e'$, when it is ready for another revolution.

The presence of a thick mass of cut grain upon the platform, or perhaps other causes, might sometimes prevent the rake from turning to a vertical position as it falls over the front end of the guide $d'$, and to insure the proper action at all times, the outer tooth $u''$ is made broader and flatter than the other rake-teeth, and it is so placed that as the rake moves forward the end of said tooth will strike upon the guide-rod $b'$, and the points of the teeth will be surely turned downward as desired.

When the traveller $t$ begins to move forward in its reciprocation, the rake T is caused to turn upon its side with the points of the teeth forward, by the action of the link $v$, which operates against a point below the centre or axis of the rake-head; but when the motion of the traveller is reversed, and the link $v$ pushes against the rake-head at this same point, the direction of the pressure will be downward as well as forward, and pressure against the front sides of the teeth will not cause the rake to turn upon its side. These movements are fully illustrated in figs. 2 and 16.

The pitman U for driving the rake is curved slightly, so as to allow it to clear the guide-frame R of the rake. The rake is driven directly by the driving-wheel C; the crank B' being provided with a catch, $a''$, which engages with a corresponding catch, $d''$, on the ring $j'$, which is caused to revolve by the hub of the driving-wheel; but, as it is of importance that the rake should move forward and return again as quickly as possible, so as to avoid as much as possible catching the falling grain upon it, I desire to cause the rake to perform its stroke forward and back again during one revolution of the driving-wheel, and to permit it to remain at rest at the rear of the platform during the succeeding revolution of said rake. Automatic rakes are generally geared so as to reciprocate forward and backward once to each two revolutions of the driving-wheel, and it will be perceived that by my plan the rake moves twice as fast as by the common arrangement, and will therefore perform its work with half the amount of loading from falling grain.

The main driving-wheel C is made with a long hub, through which the axle B passes, and on the outer part of this hub is the pitman-crank B', which turns freely upon it, and has a limited lateral motion upon the same. A portion of the hub of the pitman-crank, at the outer end, is turned out on the inside larger than the axle B, so as to receive the spring $o'$, which is coiled on the hub of the driving-wheel C. The hub of the pitman-crank B' has, upon its outer end, a catch, $a''$, fig. 6, and on the outer end of the hub of the driving-wheel C is a catch, $b''$. Beyond the end of the hub of the wheel C the axle B is made much smaller, and has a screw-thread cut upon it, on which the nut $k'$ is turned to secure all the parts together. This nut $k'$ is of the same diameter as the axle B, and has a head made on it to retain the ring $j'$ which turns upon it. This ring $j'$ has on its edge next the wheel C a catch, $c''$, corresponding with that on the hub of the wheel C, and it may be considered as a part of the same when the two are in contact. On the circumference of this ring $j'$ is a catch, $d''$, corresponding to the one on the pitman-crank hub.

The operation of these several parts will be readily understood. As the driving-wheel C revolves forward the catch $b''$, on the outer end of its hub, retains the catch $c''$ of the ring $j'$, and as they turn, the catch $d''$ comes in contact with the catch $a''$, thereby giving motion to the pitman-crank B', and thence to the rake. This arrangement alone gives a quick revolution to the rake, and causes it to make a complete circuit to one revolution of the driving-wheel. In order now that the rake may still move as rapidly in its forward and backward strokes, and only make one revolution to two of the driving-wheel, I make use of the mechanism now to be described.

On the hub of the driving-wheel C, and free to turn thereon, between it and the pitman-crank B', is the gear-wheel A', which engages with the wheel $p'$ and the U-shaped or split wedge $m'$. This wheel $p'$ is twice the size of the wheel A', and makes one revolution to two of the latter. It is supported by the standard $e''$, fig. 2, and has connected with it the eccentric, $n'$. This eccentric, as the wheel $p'$ revolves, works the wedge $m'$, which is connected with it by a strap passing around it, up and down upon the hub of the driving-wheel C, thereby forcing the pitman-crank B' in contact with the catch $d''$, so that it is caused to revolve with the wheel C, and as the thin part of the wedge $m'$ is brought between the crank B' and the wheel A', the spring $o'$, before described, forces the crank B' from the catch $d''$, and the hub of the wheel C turns within it, and the rake remains stationary until such time as the crank B' may be again brought into contact with the catch $d''$. This mechanism is so arranged that when the rake has reached the rear of the platform, and swept the grain off the same, the thin portion of the wedge $m'$ shall be brought between the crank B' and the wheel A', and the spring $o'$ will force the crank B' away from the catch $d''$, and the rake will remain at rest during one entire revolution of the driving-wheel C. The wheel A' is coupled to the wheel C by means of the pin $h'$, which passes through a hole in one of the arms or spokes of the wheel C to the ring $g'$, where it is secured. This ring $g'$ is free to slide upon the axle B next to inner part of the hub of the wheel C, and is grooved on its circumference to receive the arms of the lever C'', by means of which it is moved laterally, and the pin $h'$ withdrawn from or made to enter the hole in the wheel A' at the pleasure of the driver. The lever C'' is pivoted at $f''$ on the main frame, and is worked by the foot-lever $g''$ connected with it just forward of the tool-box. It is also kept in its proper position, and the pin $h'$ in the wheel A', by the spring $h''$.

By this arrangement, the rake only makes one revolution to two of the driving-wheel C, and if it should be necessary or desired to have the rake move as often again, or one revolution to one of the wheel C, the driver can, by pressing his foot upon the lever $g''$ just forward of the tool-box, and which is connected with the lever C'', withdraw the pin $h'$ from the gear-wheel A' at such time as the parts B' and $j'$ are in connection, or when the thick part of the wedge $m'$ is between the wheel A' and the crank B'; and then the geared wheel A' and wedge $m'$ cease to move, and the rake will make one revolution to one of the driving-wheel C, and by varying the size of the gear-wheel $p'$ the rake may make one complete revolution to two, three, or more revolutions of the driving-wheel. At the same time, however, while it is removing the grain, its velocity will be the same in either case, as it remains stationary such time as it is not removing the grain.

The grain or caster-wheel Z is secured to the outer side of the divider Y by a post, F', which is secured to the shoe and top of the divider. On this post it is free to move up and down, and in order that the outer part of the platform may not be too low, there is a sliding ring, G', on the post F', which can be set at any desired height by a set-screw, $t'$.

The manner of attaching the reel P' to the standard Q is shown at figs. 1 and 10. The shaft of the reel is held in the long box $o''$, in which it turns freely, motion being communicated to it by a pulley-cord passing over the pulley-wheel J on the axle B, and the wheel J'' secured to the inner end of the reel-shaft. The box $o''$ has a sliding head, $t''$, cast with it, which is of such size as to fit the lever Q, one arm on each side of said lever. Through these arms is a slot, in which the loose nut-bar $p''$ is placed when the reel is to be used, and it may be attached firmly to any point of the lever Q by the tightening-screw $q''$.

The advantage of the use of a loose nut-bar, as described, is that when the thread of the screw or nut may be worn out, any ordinary blacksmith would be able to replace them, which would not be the case if the whole were solid.

To the forward and inner portion of the main frame E is secured the guard $r''$ made of sheet metal, and curving back, so as to deflect any standing grain that might otherwise come inside the shoe P, within range of the cutters.

Having thus described my invention, what I claim as new, is—

1. Stopping the rake automatically at the rear of the platform during each alternate revolution of the driving-wheel, by means of the herein-described mechanism, or the equivalent thereof, for the purpose set forth.

2. The combination of the strap $s''$, eccentric $n'$, and pinions $p'$ and A', with the hubs of the driving-wheel and rake's crank, substantially as described, for the purpose of throwing the rake in or out of gear automatically, as described.

3. The combination and arrangement of the foot-lever $g''$, collar $g'$, clutch-pin $h'$, running through the arm of the driving-wheel into the driving-pinion A, for the purpose of throwing the rake out of gear at the will of the attendant.

4. The combination of the catch $b''$, on the end of the hub of the driving-wheel C, the collar $j'$, provided with the catches $c''$ and $d''$, and the catch $a''$, on the hub of the rake-crank, substantially as and for the purpose set forth.

5. The shoe P, constructed as described, so that it may be adjusted and fixed at its forward end in the manner set forth.

6. The reel-post Q, mounted upon the inner shoe, and curved forward, so that the attendant may grasp its upper end as a lever to raise the outer end of the cutting-apparatus from the ground, as set forth.

7. The sliding carriage $t$, connected with the rake-head by the arm $u$ and link Y, arranged substantially as set forth, so as to push the rake backward with the teeth vertical, and draw said rake forward again with the teeth horizontal.

8. The reel sliding head $t''$, constructed with the loose nut-bar $p''$, as and for the purpose set forth.

9. The spring-latch $s'$, constructed as described, and for the purpose set forth.

10. The construction or arrangement of the cutting-apparatus, shoe P, automatic reciprocating rake, reel P', and their operative mechanism, in relation to the main frame, so that the cutting-apparatus, with its rake and reel, may be folded and so maintained while being moved from place to place, substantially as shown and described.

11. The guide-rods $d'$ and $b'$, for the outer end of the rake, constructed and arranged as set forth and described, combined with the outer or guide-tooth $u''$ of the rake.

12. The hook $s$ and flange $v''$ to retain the rake upon its side while being drawn forward, as set forth and described.

CHARLES G. MILLER.

Witnesses:
R. D. O. SMITH,
D. B. VENTRE.